United States Patent
Gal et al.

(10) Patent No.: US 10,795,954 B2
(45) Date of Patent: Oct. 6, 2020

(54) INTERACTIVE COMMAND-LINE DATA ANALYSIS

(71) Applicant: salesforce.com, inc., San Francisco, CA (US)

(72) Inventors: Shauli Gal, Mountain View, CA (US); Satish Raghunath, Sunnyvale, CA (US); Kartikeya Chandrayana, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 261 days.

(21) Appl. No.: 15/836,679

(22) Filed: Dec. 8, 2017

(65) Prior Publication Data

US 2019/0179961 A1    Jun. 13, 2019

(51) Int. Cl.
*G06F 16/9535* (2019.01)
*G06F 16/9038* (2019.01)
*G06F 16/242* (2019.01)

(52) U.S. Cl.
CPC ...... *G06F 16/9535* (2019.01); *G06F 16/2425* (2019.01); *G06F 16/9038* (2019.01)

(58) Field of Classification Search
CPC ............. G06F 16/9038; G06F 16/2425; G06F 16/9535
USPC ......................................................... 707/722
See application file for complete search history.

(56) References Cited

U.S. PATENT DOCUMENTS

| | | | |
|---|---|---|---|
| 9,128,595 B2 * | 9/2015 | Muller | G06F 17/246 |
| 10,185,708 B2 * | 1/2019 | Miller | G06F 16/00 |
| 2018/0089287 A1 * | 3/2018 | Haggie | G06F 3/0481 |

* cited by examiner

*Primary Examiner* — Shahid A Alam
(74) *Attorney, Agent, or Firm* — Wong & Rees LLP; Kirk D. Wong (57) ABSTRACT

Data analysis is performed through a series of commands that apply functions to an initial scope of data. In a client-server architecture, a data analyst may interact with and view a scope of data through a series of commands. Query formation may be performed at a server to generate reports of data to be presented at the client.

20 Claims, 5 Drawing Sheets

INTERACTIVE COMMAND-LINE DATA ANALYSIS

TECHNOLOGY

The present invention relates generally to analysis of network performance data, and in particular, to data analysis via command-line interaction.

BACKGROUND

Information is being captured on a massive scale about anything and everything, from data captured about network interactions, data representing real-world items such as physical inventory of sneakers, to time-based data associated with various metrics of cellular networks and wireless channels. When analyzing such data, including network metrics such as latency, jitter, throughput, and losses, an analyst may be lost in a sea of data. The diversity of data comes from the various network technologies, plethora of devices, platforms, and operating systems in use.

Techniques that rely on traditional query formation and graphical data analysis do not address the fundamental issues of data exploration as they impact the user experience. Structured Query Language (SQL) is one way to interact with databases that requires a database administrator to draft complicated queries to interact with complex databases. Data analysts may falter in crafting appropriate SQL queries with correct dimension labels or column names, syntax, and remembering the scope of previous data queries. Managing query creation for both relational databases and non-relational databases remains a complex and time-consuming endeavor.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Example embodiments, which relate to optimizing networking protocol choice, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. INTERACTIVE DATA ANALYSIS VIA COMMAND
3. SERVER-BASED QUERY ANALYSIS FOR CLIENT-BASED DATA ANALYSIS
4. CLIENT-BASED DATA ANALYSIS SCOPE GENERATION
5. IMPLEMENTATION MECHANISMS—HARDWARE OVERVIEW
6. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Data analysis includes analyzing a current scope or subset of data being currently viewed, metrics related to the scope such as number of rows and time frame, selecting a set of aggregation metrics, break down the data by a set of dimensions into sub-scopes, and further investigating the sub-scopes or rolling back to the parent scope. This often requires custom query drafting and recalling dimensions of databases. For example, to gather data from a typical relational database, a Structured Query Language (SQL) type query may be drafted by a database administrator to enable a data analyst to manipulate and interact with data sets. However, this leads to inefficient use of limited resources because with new sources of data, such as third-party data sources and updated characteristics of data, new queries may need to be drafted by an experienced database administrator. In addition to impairing user experience, this ties up the limited time and development resources of the database administrator.

Data analysts may use many types of tools when exploring data sets. For example, to solve network performance and network latency issues, a data analyst may parse through data logs and other information captured about networks. Modern data transport networks feature a huge variety of network technologies, end-user devices, and software. Some of the common network technologies include cellular networks (e.g., LTE, HSPA, 3G, 4G, and other technologies), WiFi (e.g., 802.11xx series of standards), satellite, and microwave. In terms of devices and software, there are smartphones, tablets, personal computers, network-connected appliances, electronics, etc., that rely on a range of embedded software systems such as Apple iOS, Google Android, Linux, and several other specialized operating systems. Certain shared characteristics may be captured as information that impacts data delivery performance:

a. Many of these network technologies feature a volatile wireless last mile. The volatility manifests itself in the application layer in the form of variable bandwidth, latency, jitter, loss rates and other network related impairments.

b. The diversity in devices, operating system software and form factors results in a unique challenge from the perspective of user experience.

c. The nature of content that is generated and consumed on these devices is quite different from what was observed with devices on the wired Internet. The new content is very dynamic and personalized (e.g., adapted to location, end-user, other context sensitive parameters, etc.).

Generally, a tool for command-based interaction with datasets is presented here. Instead of generating and formulating long, complicated, and syntax-specific queries to view and interact with a dataset, simple commands may be sent from a client to a server to retrieve and interact with data. An initial scope of data may be defined or retrieved from historical usage. Then, a user may dive deeper into the data by narrowing the scope to a sub-scope. Or, the user may desire to broaden the scope by selecting different parameters for the dimensions of the dataset. In an embodiment, the dataset may be aggregated and/or sorted by dimension type, such as a grouping and/or ordering, using a command that is translated on the client. In presenting the dataset to the viewing data analyst user, the user may have specified break points for continuous data types, such as real numbers. In another embodiment, the system may determine break point values based on statistical analysis, such as data fit, data distribution, standard deviation, data models, data fit, and so forth.

Commands may be used to narrow and broaden the scope of the data set in an iterative fashion. By enabling the viewing user to explore the contours of the data through meta-language commands, the system improves the user experience greatly. Instead of having to recall long and complex structured query language formats, including exact names of dimensions and/or column names, the system enables the user to parse through the data in a simplified fashion. Because human error is almost eliminated through this command approach to building queries, the system performance of retrieving and displaying large data sets is greatly improved. Additionally, auto-completion tools enable the user to select from a list of dimensions and/or commands. In this way, query formation is created at the server from a rules engine that is configured with user-supplied commands. A lightweight user interface, such as a command-line style interface, may be used to quickly parse through large datasets. Because database schemas are generally hidden from data analyst users, the burden of recalling complex structured query language is reserved for database administrators ensuring the connectivity of the data stores that becomes available at the server through a representational state transfer (REST) application programming interface (API). Data analysis through querying and presenting data through aggregation metrics and/or groupings is performed by methods and techniques described herein.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Interactive Data Analysis Via Command

Data analysis may be performed using an interactive process of issuing commands instead of drafting queries. Interactive data analysis via command enables a better user experience as well as increases system performance and efficiency in resource allocation. Often, data analysts use a "trial-and-error" approach when investigating datasets because, in their quest to understand the dataset, it is beneficial to break down the dataset into smaller pieces. Scope of data used here refers to the subset of data being currently viewed by the viewing user. In command-line interfaces, it is advantageous for the scope of data to be retained in memory by the system. A "stack" is a list of scopes, where the "head" is always the "root" (e.g., all the rows in the database or all available data), the next scope descends from the root, and in general, every scope in the stack descends from the previous (e.g., parent) scope.

In command-line interfaces for data analysis, previously existing systems relied on hand-crafted queries with each prompt. Not only is this process error prone, burdensome, and complex because of the number of dimensions of data available at query formation, the previous method places a greater emphasis on how to correctly form a query using correct syntax and label names. Instead of enabling a data analyst to spend most of her time examining the data in different slices, aggregations, statistical computations, and so forth, the previous techniques require an inordinate amount of time spent on crafting the right query even before looking at the data.

Figure 1:
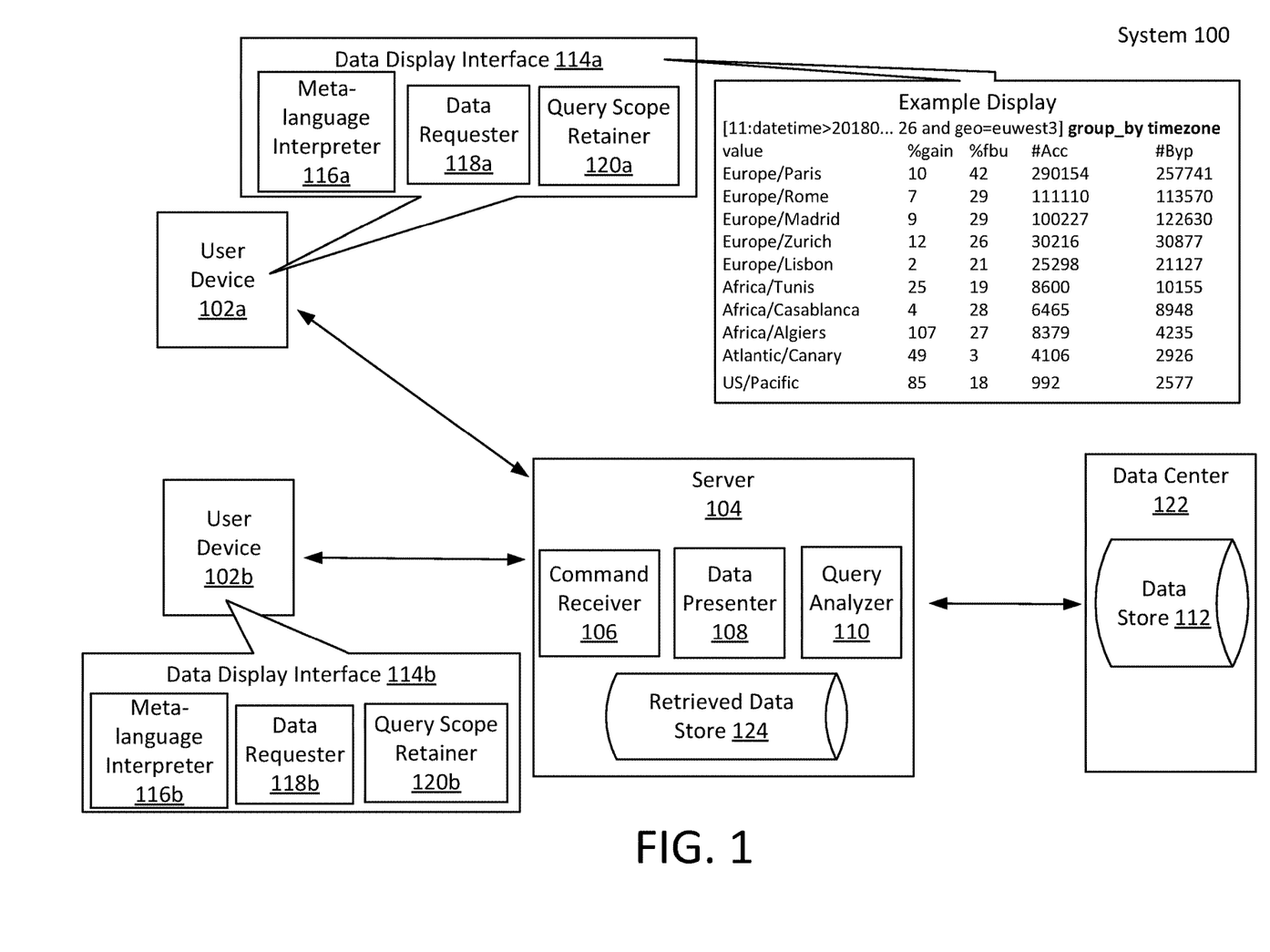
FIG. 1 illustrates a high-level block diagram, according to an embodiment of the invention.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only one user device 102 (end-devices or endpoints as described here) are shown in FIG. 1 in order to simplify and clarify the description.

As illustrated in FIG. 1, a system 100 includes a user device 102 that may request and receive information from a data center 122 over a network. The information stored in a data store 112 within the data center 122 may be transferred to a server 104 that then provides data to user devices 102a and 102b, for example. Various elements of the system 100 are not illustrated for simplicity and clarity in the description.

In an embodiment, a data display interface 114 is accessible from a user device 102 that enables a viewing user to provide user input that interacts with and/or issues commands to manipulate data provided from the server 104. The data display interface 114 is presented on the user device 102 through an application installed on the user device 102, in one embodiment. In another embodiment, the data display interface 114 is a command-line interface with the operating system of the user device 102. Included in a data display interface 114 is a meta-language interpreter 116, a data requester 118, and a query scope retainer 120, in an embodiment. User input into the data display interface 114 results in a request for a dataset being sent to the server 104 from the user device 102. The data display interface 114 displays the current scope in a command-line style interface, in one embodiment. For example, a default scope may include all data received in the past 24 hours. The data display interface 114 may present a current scope as "[1:datetime>2018-01-26]" which indicates that the only constraint on data is a "datetime" variable that has been set to a greater than operator with the parameter of Jan. 26, 2018 as the past day.

A meta-language interpreter 116 includes a query formatter that uses data stored at the user device 102. For example, an "in" command is used to dive into a column of data and a desired value. Continuing the above example, the data display interface 114 may receive the command as "[1: datetime>2018-01-26] in cid 26" where the command is "in" which is followed by a column name "cid" and a desired value "26." An "equal" operator (=) is omitted. The "in" command received within the data display interface 114 at the user device 102 is used to form a request for data. A data requester 118 issues a data request based on the "in" command to the server 104. In an embodiment, the data request sent by the data requester 118 is a HTTP request. In another embodiment, the data request is an application programming interface (API) request. A query scope retainer 120 may store at the user device 102 data representing the current scope of the dataset. As a result of the "in" command, the new scope of the dataset is [2:datetime>2018-01-28 and cid=26]. A subsequent "in" command may include a "greater than" operator, such as "in fbu>50". As a result of that subsequent "in" command, the new scope of the dataset would be [3:datetime>2018-01-28 and cid=26 and fbu>50]. In this way, the scope of the dataset is retained as part of the tool itself, eliminating the need for the data analyst to generate complicated queries with the correct syntax.

Other commands include "out" which indicates a request to go to the parent scope or the previously requested scope. In this example, an "out" command would result in the new scope to be [2:datetime>2018-01-28 and cid=26]. Another command to produce a report of data results include "group_by" which is a grouping command that specifies a desired dimension. As illustrated in FIG. 1, an example display of a data display interface 114a as presented on user device 102a shows a resulting dataset grouped by "timezone," an enumerated dimension. Additional commands include a "select" command that enables a data analyst to add a column of data to the data set, such as an aggregation metric like "sum". For dimensions that include continuous data points (such as real numbers), the group_by command may include additional parameters such as breaking points that enable the data to be presented in "buckets." For example, "size" may be a dimension that includes real number values. At the prompt, the analyst may input the command as follows: "group_by size 50000 100000" where the first break point value and second break point value are identified. In one embodiment, break points may be automatically identified based on statistical information about the dataset, such as distribution, standard deviation, and so forth.

An analyst, or viewing user, may now know some of the values of the dataset and can input a command that interacts with the data even without mentioning the dimension label. For example, an example command may be "[2:datetime>2018-01-28 and cid=26] in Europe/Zurich" where the square brackets indicate the prompt that shows the current scope of the dataset and the command "in Europe/Zurich" issues the command to narrow the scope to "datetime>2018-01-28 and cid=26 and timezone=Europe/Zurich" based on the "in" command. Here, the dimension label and the operator have been omitted.

A server 104 may include a command receiver 106, a data presenter 108, a query analyzer 110, and a retrieved data store 124. The server 104 may receive the data request from the data requester 118 at the command receiver 106. The command receiver 106 may interpret the command and provide the dataset through the data presenter 108 based on the interpretation of the command and based on data included in the retrieved data store 124. In this example, the data included in the retrieved data store 124 had been previously retrieved from the data center 108. As more "in" commands are received from the user device 102, the server 104 may present data based on the new sub-scopes defined by the "in" commands.

A data center 108 may receive requests for data stored at the data store 112 from a server 104 based on a command received at the data display interface 114. For example, if the scope of data is expanded to include other data not already retrieved at the server 104 in the retrieved data store 124, then the query analyzer 110 may issue a request to retrieve additional data stored at the data center 108. In this way, database transactions are limited and a data analyst may parse through datasets more quickly through the data display interface 114. Though relational databases are used in the example, other types of databases may be used. A query analyzer 110 is used in the formulation of queries for various types of databases, including SQL, NoSQL, and so forth.

3. Server-Based Query Analysis for Client-Based Data Analysis

Figure 2:
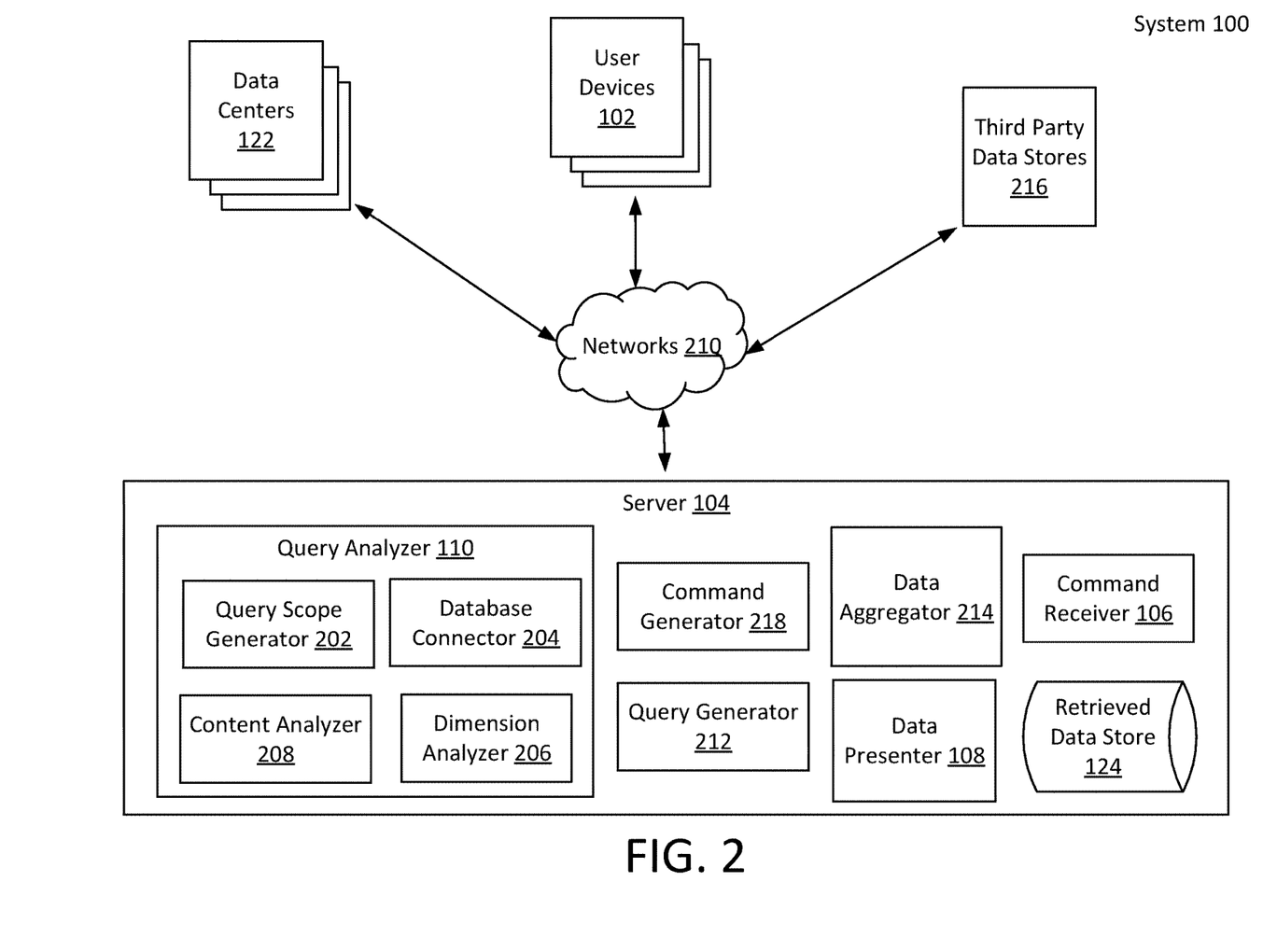
FIG. 2 illustrates a high-level block diagram, including an example query analyzer according to an embodiment of the invention.

FIG. 2 illustrates a high-level block diagram, including an example server 104, according to an embodiment. A server 104 may include a query analyzer 110 that further may include a query scope generator 202, a database connector 204, a dimension analyzer 206, and a content analyzer 208. The server 104 may also include a command receiver 106, a data presenter 108, a data aggregator 214, a query generator 212, and a command generator 218, in one embodiment. The server 104 may communicate data over one or more networks 210 with other elements of system 100, such as user devices 102, one or more third party data stores 216, and data centers 122. In this client-server architecture, the server 104 abstracts the database and exposes a clean REST API to the client. This approach removes some dependencies from the client, making installation easier. In other embodiments, the REST API may be used for any scripting purposes or alternative front-ends (different data display interfaces at the clients).

A command receiver 106 may receive a meta-language based command from a user device 102. For example, the command may be an "in" command that narrows the scope of the dataset. The command receiver 106 may interpret the command and generate a request to generate a query from the query generator 212. The query generator 212 may form a query based on the request from the command receiver 106. This query may be a typical database query that may be formed based on the current scope of the retrieved dataset. Because an initial dataset may include the data that has been generated in the past day, the new query formed will simply operate on the existing data included in the dataset and a new database interaction with the data center 122 or one or more third-party data stores 216 will be unnecessary. Thus, the query generator 212 may quickly perform the action associated with the command received. In this example, the received "in" command merely changes the current scope of the dataset and no data is returned. Thus, the query generator 212 modifies the current scope of the dataset based on the "in" command. In some embodiments, this may be referred to as "dataset caching" and/or "content caching" and presents some opportunities for latency cuts and database offload. In one approach, a histogram of the dataset (e.g., hundreds of rows or kilobytes of data) is provided such that additional interactions with the database are needed as the scope is narrowed (e.g., using the "in" command) or a different histogram is requested (e.g., using the "group_by" command). Some datasets are quite large (millions of rows or gigabytes of data), and exporting such large datasets and shipping them over the Internet is still a heavy task, elapsing in the order of minutes. Here, the dataset caching and/or content caching described involves an interactive tool which responds in the order of seconds, in an embodiment.

As the scope of the data becomes more specialized, the current scope of the dataset, as expressed in a database query language format, becomes increasingly complex. The query generator 212 stores the current scope of the dataset expressed as a database query in the retrieved data store 124. Because different types databases have different query formats, a query analyzer 110 is used in the formulation of queries.

A query analyzer 110 may be used to formulate syntactically correct queries as initially formed by the query generator 212 to retrieve additional data from data stores connected over a network 210 to the server 104. For example, as a dataset becomes more complex, selecting data from various data stores, the query analyzer 110 may be used to formulate the queries to the networked data stores.

A query scope generator 202, in one embodiment, generates a query based on the command received and the existing query that represents the current scope of the dataset. For example, if the command is an "in" command, the query scope generator 202 may generate a new query that represents the new scope of the dataset based on the parameters of the "in" command. The "out" command may generate a new query that represents the most previous scope of the dataset. Other commands related to presenting data in a report, such as "group_by" and "select" also result in the query scope generator 202 to modify a query that represents the scope of the dataset.

A database connector 204, in one embodiment, generates one or more database connections from the server 104 to data centers 122 and/or third party data stores 216. The database connector 204 manages the database connections and performs database transactions to retrieve data at the retrieved data store 124. In an embodiment, a data request from a user device 102 may result in a database transaction with one or more data centers 122 and/or one or more third party data stores 216.

A dimension analyzer 206 analyzes the dimensions of data being presented as datasets. In an embodiment, the dimension analyzer 206 stores the column names of the databases and the type of data represented in the column, such as an integer, text, character string, or real number. In another embodiment, the dimension analyzer 206 stores information that describes the data that may be stored in a non-relational database, such as MongoDB, NoSQL, or JavaScript Object Notation (JSON) format. In this way, the dimension analyzer 206 may store information about the column names of the different types of databases that may be connected to the server 104.

A content analyzer 208, in one embodiment, determines the type of data being analyzed. For example, a type of data (e.g., integer, real, float, character, text, string, etc.) and/or other characteristics of data may be determined by a content analyzer 208. This may be useful in generating and/or causing one or more statistical calculations and/or aggregations of data. Additionally, this information about the content of the data being analyzed may be used in the system automatically generating break point values for grouping of continuous value types, such as real numbers. For example, if the values of a dimension such as "size" range from 0 to 100000000, the system may automatically detect break point values based on the distribution or clustering of the data. In other embodiments, the system may automatically configure break point values based on other statistical information, such as a standard deviation. In yet other embodiments, datasets may follow a particular data model, where the system automatically generates break point values based on the fit to the particular data model.

A command receiver 106 receives commands from user devices 102, as mentioned above. The commands include, but are not limited to, "in," "out," "select sum," "select median," and "group_by" followed by one or more parameters. Another command that may be received is "show sql" which outputs the current SQL query, in an embodiment, that represents the current scope of data. Over time, additional commands may be created to perform various functionality as requested by data analyst users. The command receiver 106 may be updated over time to accommodate the newly created commands. This enables the system to grow with the needs of its users.

A data presenter 108 determines a format of data to be presented to user devices 102 as a result of commands received. The server 104 receives the HTTP request and delivers an HTTP response that includes the data to be presented by the data presenter 108. In an embodiment, the data presenter 108 modifies the format of the data presented based on a command received, such as a "group_by" command. In other embodiments, other front end interfaces may be used instead of a command-line style interface. For example, the REST API may be used at the server 104 to enable any type of interface to be used to interact with the data, such as graphical user interfaces, among other types of interfaces.

A data aggregator 214 gathers data from the one or more databases available to the server 104 over the network 210. For example, a data store may be accessible via a data center 122. The data aggregator 214 may also retrieve data from the one or more data stores at the data center 122 and/or third party data store 216. The data aggregator 214 may store information about the data stores available for access by the server 104, including the type of database management systems used to organize the data available.

A query generator 212 generates a query based on the syntax of the querying language of the database from which data is being retrieved. The query generator 212 may generate a query based on a rules engine, in an embodiment. In another embodiment, the query generator 212 may generate a query based on a grammar based on the command. In a further embodiment, the query generator 212 may generate a query based on a set of programmable instructions for the set of commands and for the different types of databases that are communicated with by the server 104.

A command generator 218 is used to generate new commands for interacting with datasets via user devices 102. Over time, new functionality may be requested by data analyst users. The command generator 218 may enable administrators to insert programmable logic to introduce new commands to be received by the command receiver 106, relates to query language to be generated by the query generator 212, provides a different way of aggregating data to the data aggregator 214 and/or is associated with data formatting context provided by the data presenter 108.

4. Client-Based Data Analysis Scope Generation

Figure 3:
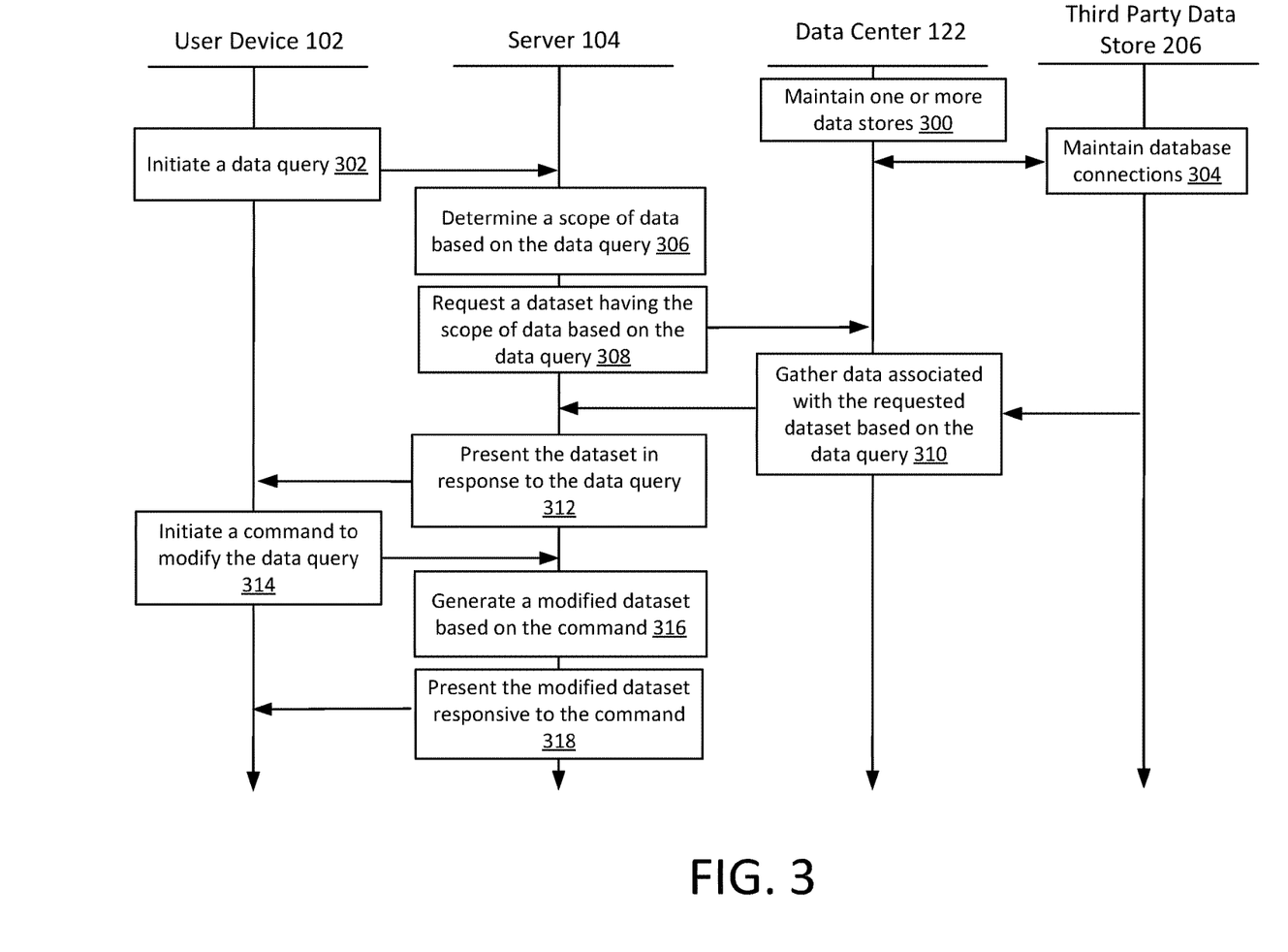
FIG. 3 illustrates a high-level interaction flow diagram of interactive command-line based data analysis, according to an embodiment of the invention.

FIG. 3 illustrates a high-level interaction diagram of interactive command-line based data analysis, according to an embodiment. One or more data stores are maintained 300 in a data center 122. Data stores, or databases, are an organized collection of data. Data stores are maintained 300 by a system that enables entry, storage, and retrieval of large quantities of information and provides methods of managing how the information is organized. As mentioned above, large quantities of data may be stored in non-relational databases, such as a JSON object-oriented file. Log files may capture enormous amounts of data that may have clues to why networks slow down under various conditions. Thus, data stores may include differently organized databases, including log files, flat files, NoSQL files, as well as more structured databases, such as relational databases like MySQL, SQL Server, as well as proprietary database formats such as Salesforce Object Query Language (SOQL) that is used to search data on a proprietary platform. A third party data store 206 maintains 304 database connections with the data center 122. A data query may be initiated 302 at a user device 102. As described above, the data query is initiated 302 through a series of commands that narrow the scope of the data and selects various dimensions of data to group and/or aggregate data. A server 104 determines 306 a scope of data based on the data query. The server 104 then requests 308 a dataset having the scope of data based on the data query 308. In a typical scenario, an initial scope of data, such as the data received in a log file over the past day, is retrieved from various data stores connected to the data center 122. Based on the data query, data associated with the requested data set is gathered 310 at the data center 122. For example, a request for the past day's data may be already stored at a data store at the data center 122. In another embodiment, a request is made that requires a database transaction from a third party data store 206. In this way, the database is abstracted away from the user device 102 perspective because the data is exposed through a REST API at the server 104. In a further embodiment, data may be gathered at the server 104.

The dataset is then presented 312 by the server 104 to the user device 102 in response to the data query. At the user device 102, a command is initiated 314 to modify the data query. At the server 104, a modified dataset is generated 316 based on the command. For example, the command may be an "in" command that narrows the scope of the dataset. The generated modified dataset is then presented 318 by the server 104 to the user device 102 responsive to the command.

Figure 4:
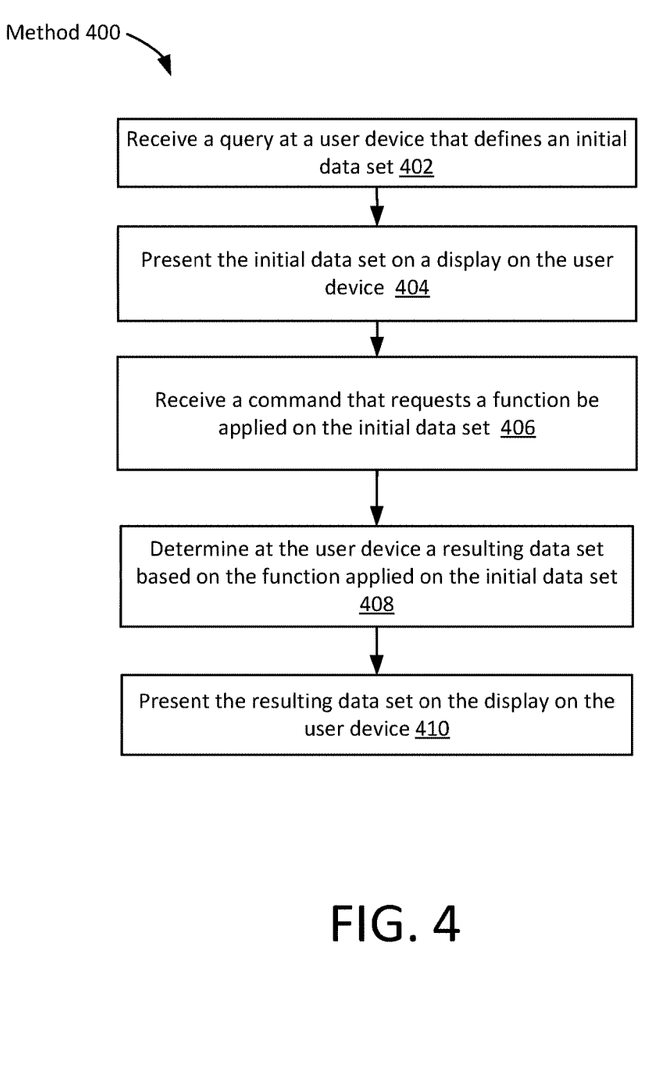
FIG. 4 illustrates a flowchart for client-based data analysis, according to an embodiment of the invention.

FIG. 4 illustrates a flowchart for client-based data analysis, according to an embodiment of the invention. Method 400 may be used to enable client-based data analysis without requiring an analyst to generate complex queries, in an embodiment. A query is received 402 at a user device that defines an initial data set. For example, the initial scope of data may be configured to retrieve the data received in the past twenty-four (24) hours. As another example, the last used query may be retained from a previous session and may be initialized as the query received 402 from a method or process that retains that last used query. The initial data set is presented 404 on a display on the user device. In an embodiment, the initial data set may be presented 404 as a scope of data that indicates to the data analyst what the current scope of data is without display all values within the data set.

Then, a command is received 406 that requests a function be applied on the initial data set. The functions that may be applied are described above throughout and further described with respect to FIG. 1. For example, the "in" command may narrow the scope of the data set while the "out" command may broaden the scope of the data set. Another function that may be applied on the initial data set may be to select an aggregation metric, such as the sum of a particular dimension of data. At the user device, a resulting data set can then be determined 408 based on the function applied on the initial data set, in an embodiment. This enables simple functions, such as statistical calculations and aggregations and/or groupings, to be performed at the user device.

The resulting data set is then presented 410 on the display on the user device. As mentioned above with respect to FIG. 1, the data display interface that presents 410 the data on the display on the user device may be a command-line style interface. The method 400 may be repeated in an ongoing manner. In other embodiments, a different front-end interface may be used to present 410 the resulting data set.

In the information age, analyzing datasets from disparate sources is a challenge. While some databases retain relational inferential structures, other databases are more object-oriented and do not rely on a structured query language. The diversity of devices, content, device types, access mediums, etc., further compound the volume of data being collected on these devices. For example, a large amount of information about the network is available from billions of devices consuming data and interacting with data. Data analysis begins with data exploration and identifying potential causes of abnormalities is discovered through creating context. Because the method 400 presents a manner of client-based data analysis, the system is able to enable quick and simple ways for the viewing user to interact with the data without formulating complex queries in a structured way with each prompt. Instead, the system provides a client-server architecture that improves the overall performance of retrieving data from disparate data stores. In this way, the database is abstracted away as a REST API.

Using the method 400, complex queries may be formulated through commands that are syntactically correct, eliminating human error, thereby increasing efficiency. The method 400 above, by eliminating human error, in various embodiments, allows more efficient analysis of system problems. This may enable automatic or operator-initiated modifications to system parameters that increases efficiency of the overall system performance, increases the efficiency of server and/or client computing performance, and aides in the systematic handling of problems that cause network performance issues from the viewpoint of the client device. For example, performance analysis, especially in nesting and fine tuning data, may be performed using the method 400 above. By transacting histograms of the dataset, an interactive tool may provide dataset caching for small datasets, such as thousands of rows, in an embodiment. In other embodiments, larger datasets may require additional scaling mechanisms.

As a result, the performance of the system is improved by generating data sets from disparate data sources and creating reports based on intuitive meta-language commands. Data analysis is generated to point to specific areas of various systems, such as a content delivery system provided over a network, that can be improved and a concrete assessment of the impact of that improvement will have on the overall performance of the system. By efficiently calculating and determining such improvements, the system continuously collects information across the network that allows for more precise efficiency recommendations or network changes, over time. This information that describes network operating characteristics and defines efficacy of data delivery strategies is called a "network imprint". The approaches described herein allow embodiments to compute this network imprint. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

5. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
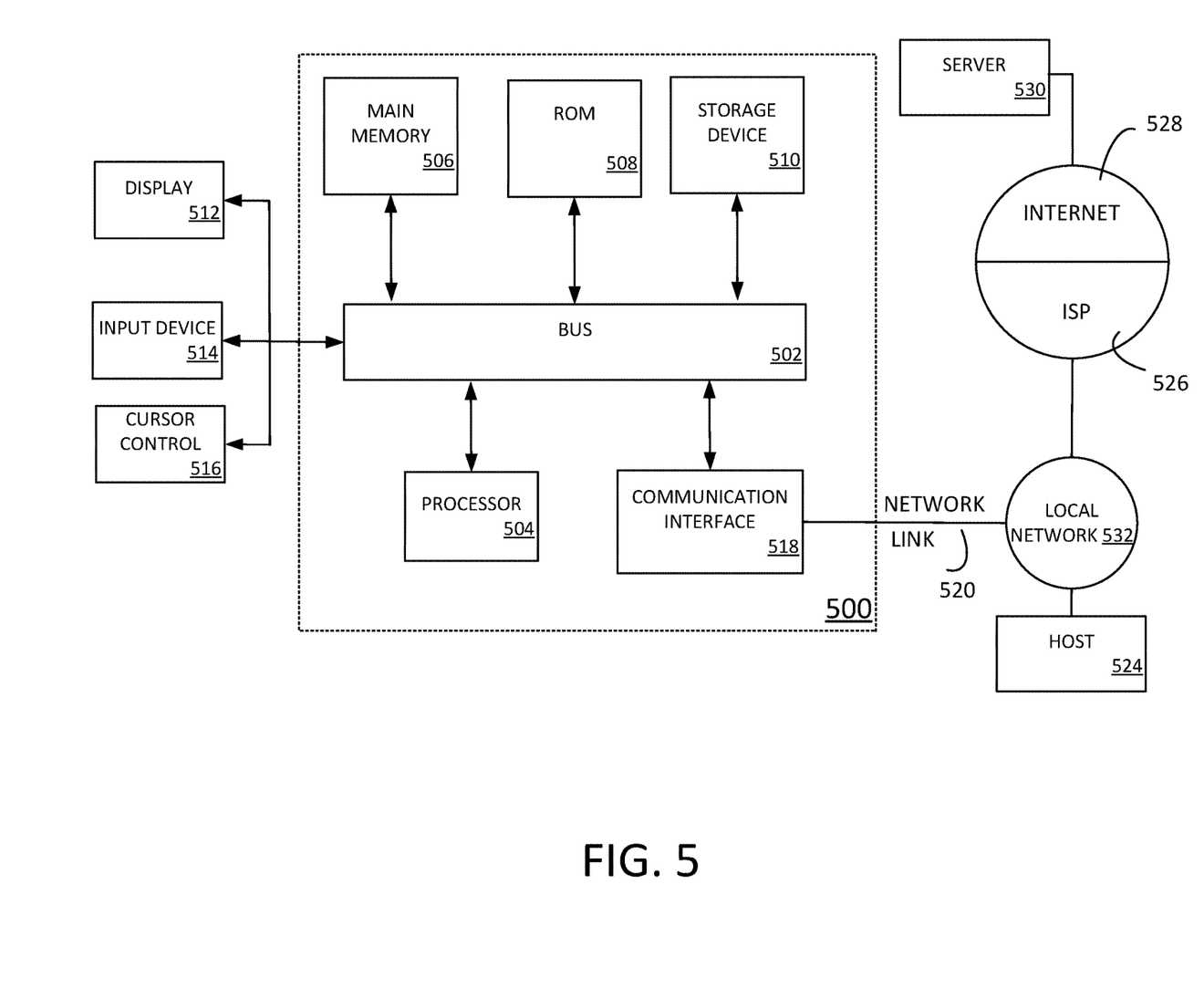
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method executing on a processor having a memory, comprising:
    determining an initial scope of a dataset received at a client from a data source among a plurality of data sources in response to a data query from the client;
    causing display of a first user interface element in a data display user interface at the client, wherein the first user interface element comprises an indication of the initial scope of the dataset and wherein the initial scope of the dataset comprises a first set of data received from the data source based on a first dimension;
    receiving, in the data display user interface, one or more meta-language commands to apply a function to the initial scope of the dataset;
    modifying, by the client, the data query to include the function by generating query language specific to the data source to implement the function in the data query;
    determining, at the client, a subsequent scope of the dataset after applying the modified data query to the dataset;
    causing display of the one or more meta-language commands used to modify the data query in the data display user interface at the client;
    causing display of a second user interface element in the data display user interface at the client,
        wherein the second user interface element comprises an indication of the subsequent scope of the dataset.

2. The method as recited in claim 1, wherein the one or more meta-language commands apply a narrowing function on the initial scope by adding a second dimension to filter the dataset.

3. The method as recited in claim 2, wherein the indication of the subsequent scope of the dataset comprises the first dimension and the second dimension.

4. The method as recited in claim 1, wherein the one or more meta-language commands apply a grouping function on the initial scope that presents the dataset in a grouped way in the data display interface at the client.

5. The method as recited in claim 1, further comprising:
    wherein the one or more meta-language commands selects an aggregation metric function on a selected dimension of the dataset;
    causing display of the aggregation metric in a display report on the dataset in the data display interface at the client.

6. The method as recited in claim 1, further comprising:
    requesting a second dataset from the data source based on the one or more meta-language commands;
    receiving the second dataset from the data source.

7. The method as recited in claim 4, wherein the grouping function comprises a breakpoint determined from one or more parameters included in the one or more meta-language commands.

8. The method as recited in claim 4, wherein the grouping function comprises a breakpoint determined by the data source based on a statistical analysis of the dataset.

9. One of more non-transitory computer-readable storage media, storing one or more sequences of instructions, which when executed by one or more processors cause performance of:
    determining an initial scope of a dataset received at a client from a data source among a plurality of data sources in response to a data query from the client;
    causing display of a first user interface element in a data display user interface at the client, wherein the first user interface element comprises an indication of the initial scope of the dataset and wherein the initial scope of the dataset comprises a first set of data received from the data source based on a first dimension;
    receiving, in the data display user interface, one or more meta-language commands to apply a function to the initial scope of the dataset;
    modifying, by the client, the data query to include the function by generating query language specific to the data source to implement the function in the data query;
    determining, at the client, a subsequent scope of the dataset after applying the modified data query to the dataset;

causing display of the one or more meta-language commands used to modify the data query in the data display user interface at the client;

causing display of a second user interface element in the data display user interface at the cent, wherein the second user interface element comprises an indication of the subsequent scope of the dataset.

10. The one or more non-transitory computer-readable storage media as recited in claim 9, wherein the one or more meta-language commands apply a narrowing function on the initial scope by adding a second dimension to filter the dataset.

11. The one or more non-transitory computer-readable storage media as recited in claim 10, wherein the indication of the subsequent scope of the dataset comprises the first dimension and the second dimension.

12. The one or more non-transitory computer-readable storage media as recited in claim 9, wherein the one or more meta-language commands apply a grouping function on the initial scope that presents the dataset in a grouped way in the data display interface at the client.

13. The one or more non-transitory computer-readable storage media as recited in claim 9, further comprising:
wherein the one or more meta-language commands selects an aggregation metric function on a selected dimension of the dataset;
causing display of the aggregation metric in a display report on the dataset in the data display interface at the client.

14. The one or more non-transitory computer-readable storage media as recited in claim 9, further comprising:
requesting a second dataset from the data source based on the one or more meta-language commands;
receiving the second dataset from the data source.

15. A client apparatus, comprising:
one or more processors; and
a memory storing instructions, which when executed by the one or more processors,
cause the one or more processors to:
determine an initial scope of a dataset received at the client from a data source among a plurality of data sources in response to a data query from the client;
cause display of a first user interface element in a data display user interface at the client, wherein the first user interface element comprises an indication of the initial scope of the dataset and wherein the initial scope of the dataset comprises a first set of data received from the data source based on a first dimension;
receive, in the data display user interface, one or more meta-language commands to apply a function to the initial scope of the dataset;
modify the data query to include the function by generating query language specific to the data source to implement the function in the data query;
determine a subsequent scope of the dataset after applying the modified data query to the dataset;
causing display of the one or more meta-language commands used to modify the data query in the data display user interface at the client;
cause display of a second user interface element in the data display user interface at the client,
wherein the second user interface element comprises an indication of the subsequent scope of the dataset.

16. The client apparatus as recited in claim 15, wherein the one or more meta-language commands apply a narrowing function on the initial scope by adding a second dimension to filter the dataset.

17. The client apparatus as recited in claim 16, wherein the indication of the subsequent scope of the dataset comprises the first dimension and the second dimension.

18. The client apparatus as recited in claim 15, wherein the one or more meta-language commands apply a grouping function on the initial scope that presents the dataset in a grouped way in the data display interface at the client.

19. The client apparatus as recited in claim 15, further comprising:
wherein the one or more meta-language commands selects an aggregation metric function on a selected dimension of the dataset;
cause display of the aggregation metric in a display report on the dataset in the data display interface at the client.

20. The client apparatus as recited in claim 15, further comprising:
request a second dataset from the data source based on the one or more meta-language commands;
receive the second dataset from the data source.

* * * * *

UNITED STATES PATENT AND TRADEMARK OFFICE
CERTIFICATE OF CORRECTION

PATENT NO. : 10,795,954 B2
APPLICATION NO. : 15/836679
DATED : October 6, 2020
INVENTOR(S) : Gal et al.

Page 1 of 1

It is certified that error appears in the above-identified patent and that said Letters Patent is hereby corrected as shown below:

In the Claims

Column 14
Claim 9: Line 46: Delete "of" and insert --or--

Column 15
Claim 9: Line 5: Delete "cent" and insert --client--

Signed and Sealed this
Tenth Day of November, 2020

Andrei Iancu
*Director of the United States Patent and Trademark Office*